(12) United States Patent
Benito et al.

(10) Patent No.: US 7,988,414 B2
(45) Date of Patent: Aug. 2, 2011

(54) METHOD AND SYSTEM FOR OPERATING A WIND TURBINE GENERATOR

(75) Inventors: Pedro L. Benito, Rheine (DE); Jing Wang, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 311 days.

(21) Appl. No.: 12/254,633

(22) Filed: Oct. 20, 2008

(65) Prior Publication Data

US 2010/0098541 A1 Apr. 22, 2010

(51) Int. Cl.
*F01D 7/00* (2006.01)

(52) U.S. Cl. ........................... 416/33; 416/44

(58) Field of Classification Search ............... 416/26, 416/33, 34, 40; 415/119
See application file for complete search history.

(56) References Cited

U.S. PATENT DOCUMENTS

| | | | |
|---|---|---|---|
| 3,822,105 A | 7/1974 | Jepson | |
| 4,297,076 A | 10/1981 | Donham et al. | |
| 5,620,303 A | 4/1997 | Moffitt et al. | |
| 5,620,304 A | 4/1997 | Matsuka et al. | |
| 5,730,581 A | 3/1998 | Buter et al. | |
| 5,735,670 A | 4/1998 | Moffitt et al. | |
| 6,004,095 A | 12/1999 | Waitz et al. | |
| 6,092,990 A | 7/2000 | Hassan et al. | |
| 6,234,751 B1 | 5/2001 | Hassan et al. | |
| 6,478,541 B1 | 11/2002 | Charles et al. | |
| 6,543,719 B1 | 4/2003 | Hassan et al. | |
| 6,671,590 B1 | 12/2003 | Betzina et al. | |
| 7,160,083 B2 | 1/2007 | Pierce et al. | |
| 7,569,945 B2 * | 8/2009 | Pedersen | ........................ 290/44 |
| 2004/0115057 A1 | 6/2004 | Wobben | |
| 2007/0018457 A1 | 1/2007 | Gonzalez | |

FOREIGN PATENT DOCUMENTS

| | | | |
|---|---|---|---|
| DE | 19738278 A1 | | 3/1999 |
| EP | 2000665 A2 | * | 12/2008 |
| JP | 2004293527 A | * | 10/2004 |
| WO | WO2007/110459 A1 | | 3/2007 |

OTHER PUBLICATIONS

S. Oerlemans and B. Mendez Lopez, "Acoustic Array Measurements on a Full Scale Wind Turbine," May 23-25, 2005, pp. 1-32; 11th AIAA/CEAS Aeroacoustics Conference, Monterey, California.

Search Report and Opinion, European Patent Office, International Application No. PCT/ES2007/000168, Date of Completion of Search Jun. 28, 2007, pp. 1-2.

(Continued)

*Primary Examiner* — Edward Look
*Assistant Examiner* — Dwayne J White
(74) *Attorney, Agent, or Firm* — Armstrong Teasdale LLP

(57) ABSTRACT

A method of operating a wind turbine generator having at least one wind turbine blade includes increasing a pitch angle of the at least one wind turbine blade as the at least one wind turbine blade rotates through a first range of blade azimuth values. Such increasing of the pitch angle reduces acoustic emissions generated by the wind turbine generator. The method also includes decreasing the pitch angle of the at least one wind turbine blade as the at least one wind turbine blade rotates through a second range of blade azimuth values. Such decreasing of the pitch angle increases electric power generated by the wind turbine generator.

19 Claims, 9 Drawing Sheets

OTHER PUBLICATIONS

Energy Research Centre of the Netherlands (ECN)(NL), Final Report, "Silent Rotors By Acoustic Optimisation," Sep. 2007, pp. 1-15, Project Funded by the European Community Under the 5th Framework Programme (1998-2002).

Energy Research Centre of the Netherlands (ECN)(NL), SIROCCO, "Silent Rotors By Acoustic Optimisation," Sep. 20-21, 2007, pp. 1-23, Second International Meeting on Wind Turbine Noise, Lyon, France.

* cited by examiner

METHOD AND SYSTEM FOR OPERATING A WIND TURBINE GENERATOR

BACKGROUND OF THE INVENTION

The subject matter described herein generally relates to wind turbine generators and, more particularly, to a method and system for reducing noise generation in wind turbine generators.

At least some known wind turbine generators include a rotor having multiple blades. The rotor is sometimes coupled to a housing, or nacelle, that is positioned on top of a base, for example, a truss or tubular tower. At least some known utility grade wind turbines (i.e., wind turbines designed to provide electrical power to a utility grid) have rotor blades having predetermined shapes and dimensions. The rotor blades transform mechanical wind energy into induced blade lift forces that further induce a mechanical rotational torque that drives one or more generators, subsequently generating electric power. The generators are sometimes, but not always, rotationally coupled to the rotor through a gearbox. The gearbox steps up the inherently low rotational speed of the turbine rotor for the generator to efficiently convert the rotational mechanical energy to electrical energy, which is fed into the electric utility grid. Gearless direct drive wind turbine generators also exist.

During operation of such known wind turbine generators, rotational transiting of the rotor blades through air generates aerodynamic acoustic emissions, or noise. At least some of such acoustic emissions include an amplitude having a decibel (dB) level that at least sometimes approaches local regulatory levels. Accordingly, it would be desirable to provide a method and/or a system that facilitates a reduction in potential acoustic emissions' dB levels such that such acoustic emissions' amplitudes are below predetermined dB parameters while maintaining predetermined electric power generation.

BRIEF DESCRIPTION OF THE INVENTION

In one aspect, a method of operating a wind turbine generator having at least one wind turbine blade is provided. The method includes increasing a pitch angle of the at least one wind turbine blade as the at least one wind turbine blade rotates through a first range of blade azimuth values. Such increasing of the pitch angle reduces acoustic emissions generated by the wind turbine generator. The method also includes substantially simultaneously decreasing the pitch angle of the at least one wind turbine blade as the at least one wind turbine blade rotates through a second range of blade azimuth values. Such decreasing of the pitch angle increases electric power generated by the wind turbine generator.

In another aspect, a wind turbine blade pitch control system is provided. The system includes at least one blade pitch drive mechanism coupled to a wind turbine blade. The system also includes at least one processor coupled to the at least one blade pitch drive mechanism. The processor is programmed to increase a pitch angle of a first wind turbine blade as the first wind turbine blade rotates through a first portion of a 360° blade rotational path, thereby facilitating a reduction of acoustic emissions generated by a wind turbine generator. The processor is also programmed to decrease a pitch angle of a second wind turbine blade as the second wind turbine blade rotates through a second portion of the 360° blade rotational path, thereby facilitating an increase in power generated by the wind turbine generator.

In still another aspect, a wind turbine generator is provided. The wind turbine generator includes at least one wind turbine blade and a blade pitch control system. The system includes at least one blade pitch drive mechanism coupled to the at least one wind turbine blade. The system also includes at least one processor coupled to the at least one blade pitch drive mechanism. The processor is programmed to increase a pitch angle of the at least one wind turbine blade as the at least one wind turbine blade rotates through a first range of blade azimuth values, thereby facilitating a reduction of acoustic emissions generated by a wind turbine generator. The processor is also programmed to substantially simultaneously decrease a pitch angle of the at least one wind turbine blade as the at least one wind turbine blade rotates through a second range of blade azimuth values, thereby facilitating an increase in power generated by the wind turbine generator.

The method and system described herein facilitate operation of wind turbine generators by actively controlling blade pitch. Specifically, a technical effect of modulating the pitch for each blade, and thereby modulating a cross-sectional area of each blade that is exposed to wind, effectively decreases a dB level of acoustic emissions, or noise, being generated. Also, specifically, modulating the pitch of the blades within predetermined parameters facilitates generating electric power within a predetermined range during blade pitch transients.

DETAILED DESCRIPTION OF THE INVENTION

The method and system described herein facilitate operation of wind turbine generators by actively controlling blade pitch. Such method and system includes implementation of a blade pitch control system that modulates pitch angles of each of a plurality of wind turbine blades as a function of position of the blades along an azimuthal rotation path. Specifically, a technical effect of modulating the pitch for each blade, and thereby modulating a blade tip speed by modulating a cross-sectional area of each blade that is exposed to wind, decreases a dB level of acoustic emissions, or noise, being generated. Also, specifically, modulating the pitch of the blades within a predetermined range facilitates generating electric power within a predetermined range during blade pitch transients. Further, specifically, modulating the pitch of the blades within a predetermined range facilitates reducing a potential for accelerated component wear.

Figure 1:
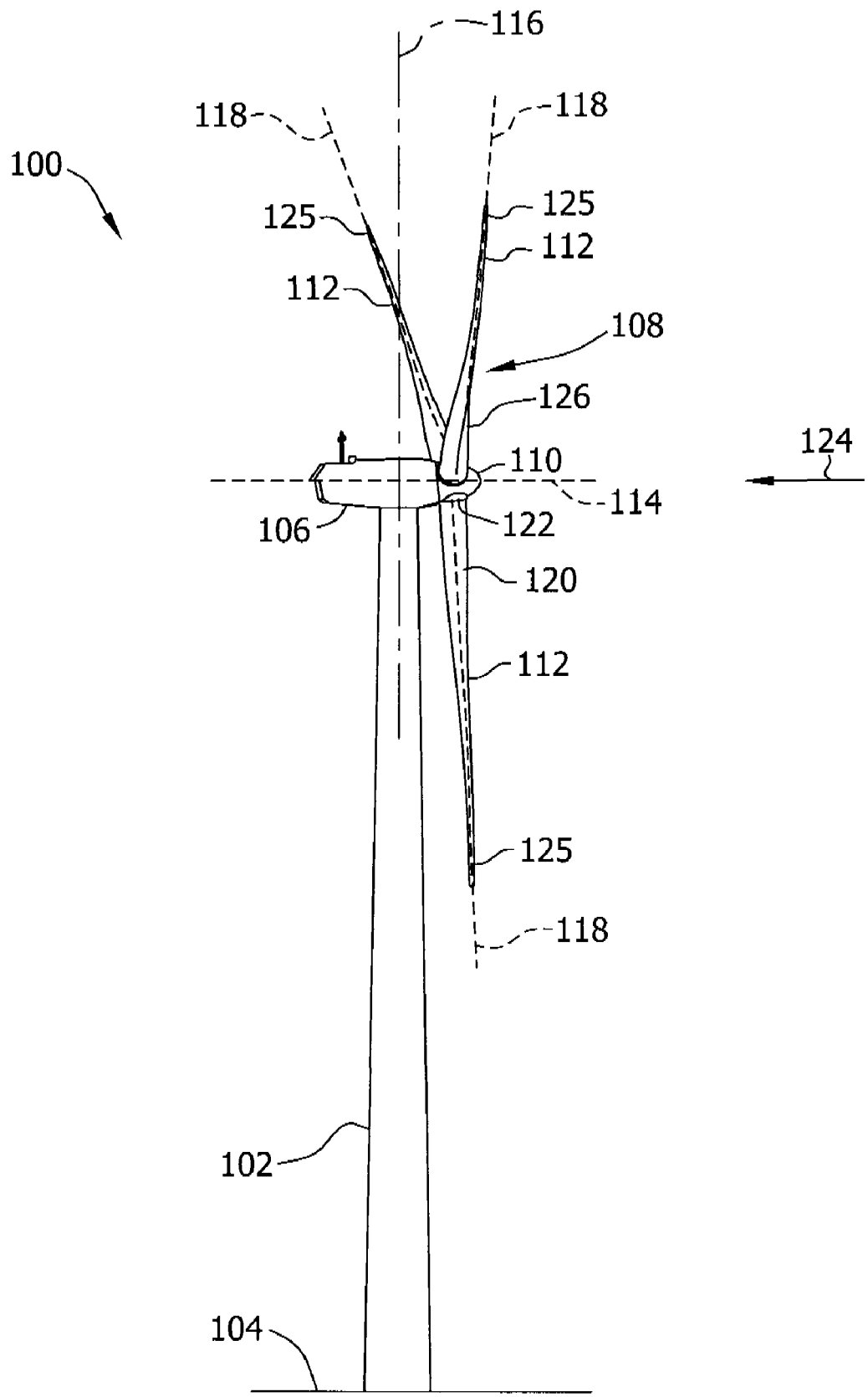
FIG. 1 is a schematic view of an exemplary wind turbine generator.

FIG. 1 is a schematic view of an exemplary wind turbine generator 100. In the exemplary embodiment, wind turbine generator 100 is a horizontal axis wind turbine. Alternatively, wind turbine 100 may be a vertical axis wind turbine. Wind turbine 100 has a tower 102 extending from a supporting surface 104, a nacelle 106 coupled to tower 102, and a rotor 108 coupled to nacelle 106. Rotor 108 has a rotatable hub 110 and a plurality of rotor blades 112 coupled to hub 110. In the exemplary embodiment, rotor 108 has three rotor blades 112. Alternatively, rotor 108 has any number of rotor blades 112 that enables wind turbine generator 100 to function as described herein. In the exemplary embodiment, tower 102 is fabricated from tubular steel and has a cavity (not shown in FIG. 1) extending between supporting surface 104 and nacelle 106. Alternatively, tower 102 is any tower that enables wind turbine generator 100 to function as described herein including, but not limited to, a lattice tower. The height of tower 102 is any value that enables wind turbine generator 100 to function as described herein.

Blades 112 are positioned about rotor hub 110 to facilitate rotating rotor 108, thereby transferring kinetic energy from wind 124 into usable mechanical energy, and subsequently, electrical energy. Rotor 108 and nacelle 106 are rotated about tower 102 on a yaw axis 116 to control the perspective of blades 112 with respect to the direction of wind 124. Blades 112 are mated to hub 110 by coupling a blade root portion 120 to hub 110 at a plurality of load transfer regions 122. Load transfer regions 122 have a hub load transfer region and a blade load transfer region (both not shown in FIG. 1). Loads induced in blades 112 are transferred to hub 110 via load transfer regions 122. Each of blades 112 also includes a blade tip portion 125.

In the exemplary embodiment, blades 112 have a length between 50 meters (m) (164 feet (ft)) and 100 m (328 ft), however these parameters form no limitations to the instant disclosure. Alternatively, blades 112 may have any length that enables wind turbine generator to function as described herein. As wind 124 strikes each of blades 112, blade lift forces (not shown) are induced on each of blades 112 and rotation of rotor 108 about rotation axis 114 is induced as blade tip portions 125 are accelerated. A pitch angle (not shown) of blades 112, i.e., an angle that determines each of blades' 112 perspective with respect to the direction of wind 124, may be changed by a pitch adjustment mechanism (not shown in FIG. 1). Specifically, increasing a pitch angle of blade 112 decreases a percentage of area 126 exposed to wind 124 and, conversely, decreasing a pitch angle of blade 112 increases a percentage of area 126 exposed to wind 124.

For example, a blade pitch angle of approximately 0 degrees (sometimes referred to as a "power position") exposes a significant percentage of a blade surface area 126 to wind 124, thereby resulting in inducement of a first value of lift forces on blade 112. Similarly, a blade pitch angle of approximately 90 degrees (sometimes referred to as a "feathered position") exposes a significantly lower percentage of blade surface area 126 to wind 124, thereby resulting in inducement of a second value of lift forces on blade 112. The first value of lift forces induced on blades 112 is greater than the second value of lift forces induced on blades 112 such that values of lift forces are directly proportional to blade surface area 126 exposed to wind 124. Therefore, values of lift forces induced on blades 112 are indirectly proportional to values of blade pitch angle.

Also, for example, as blade lift forces increase, a linear speed of blade tip portion 125 increases. Conversely, as blade lift forces decrease, linear speed of blade tip portion 125 decreases. Therefore, values of linear speed of blade tip portion 125 are directly proportional to values of lift forces induced on blades 112 and it follows that linear speed of blade tip portion 125 is indirectly proportional to blade pitch angle.

Moreover, as speed of blade tip portion 125 increases, an amplitude (not shown) of acoustic emissions (not shown in FIG. 1) from blade 112 increases. Conversely, as speed of blade tip portion 125 decreases, an amplitude of acoustic emissions from blades 112 decreases. Therefore, the amplitude of acoustic emissions from blades 112 is directly proportional to a linear speed of blade tip portions 125 and, it follows that the amplitude of acoustic emissions from blades 112 is indirectly proportional to blade pitch angle.

The pitch angles of blades 112 are adjusted about a pitch axis 118 for each of blades 112. In the exemplary embodiment, the pitch angles of blades 112 are controlled individually. Alternatively, blades' 112 pitch may be controlled as a group. Still further alternatively, the pitch of the blades, and the speed of the blades 112 may be modulated in order to reduce acoustic emissions. Preferably, wind turbine 100 may be controlled to reduce the potential acoustic emissions by a local controller (not shown), or remotely via a remote controller (not shown) to reduce noise.

Figure 2:
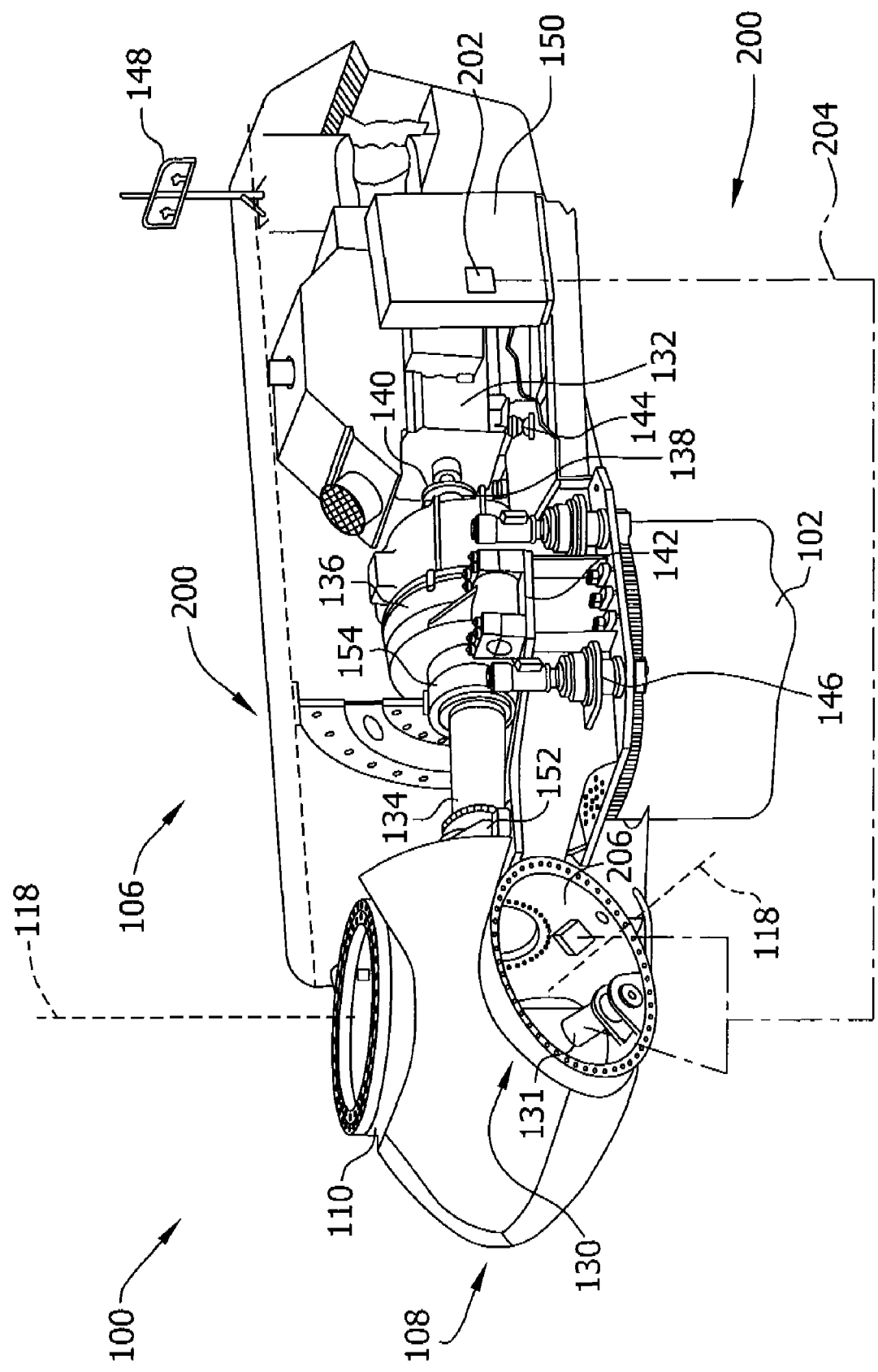
FIG. 2 is a cross-sectional schematic view of a nacelle that may be used with the wind turbine generator shown in FIG. 1.

FIG. 2 is a cross-sectional schematic view of nacelle 106 of exemplary wind turbine 100. Various components of wind turbine 100 are housed in nacelle 106 atop tower 102 of wind turbine 100. Nacelle 106 includes one pitch drive mechanism 130 that is coupled to one blade 112 (shown in FIG. 1), wherein mechanism 130 modulates the pitch of associated blade 112 along pitch axis 118. Only one of three pitch drive mechanisms 130 is shown in FIG. 2. In the exemplary embodiment, each pitch drive mechanism 130 includes at least one pitch drive motor 131, wherein pitch drive motor 131 is any electric motor driven by electrical power that enables mechanism 130 to function as described herein. Alternatively, pitch drive mechanisms 130 include any suitable structure, configuration, arrangement, and/or components such as, but not limited to, hydraulic cylinders, springs, and servomechanisms. Moreover, pitch drive mechanisms 130 may be driven by any suitable means such as, but not limited to, hydraulic fluid, and/or mechanical power, such as, but not limited to, induced spring forces and/or electromagnetic forces.

Nacelle 106 also includes a rotor 108 that is rotatably coupled to an electric generator 132 positioned within nacelle 106 via rotor shaft 134 (sometimes referred to as low speed shaft 134), a gearbox 136, a high speed shaft 138, and a coupling 140. Rotation of shaft 134 rotatably drives gearbox 136 that subsequently rotatably drives shaft 138. Shaft 138 rotatably drives generator 132 via coupling 140 and shaft 138 rotation facilitates generator 132 production of electrical power. Gearbox 136 and generator 132 are supported by supports 142 and 144, respectively. In the exemplary embodiment, gearbox 136 utilizes a dual path geometry to drive high speed shaft 138. Alternatively, main rotor shaft 134 is coupled directly to generator 132 via coupling 140.

Nacelle 106 further includes a yaw adjustment mechanism 146 that may be used to rotate nacelle 106 and rotor 108 on axis 116 (shown in FIG. 1) to control the perspective of blades 112 with respect to the direction of the wind. Nacelle 106 also includes at least one meteorological mast 148, wherein mast 148 includes a wind vane and anemometer (neither shown in FIG. 2). Mast 148 provides information to a turbine control system (not shown) that may include wind direction and/or wind speed. A portion of the turbine control system resides within a control panel 150. Nacelle 106 further includes forward and aft support bearings 152 and 154, respectively, wherein bearings 152 and 154 facilitate radial support and alignment of shaft 134.

Wind turbine generator 100 includes a pitch control system 200, wherein at least a portion of pitch control system 200 is positioned in nacelle 106, or less preferably, outside nacelle 106. Specifically, at least a portion of pitch control system 200 described herein includes at least one processor 202 and a memory device (not shown), and at least one input/output (I/O) conduit 204, wherein conduit 204 includes at least one I/O channel (not shown). More specifically, processor 202 is positioned within control panel 150. Pitch control system 200 substantially provides a technical effect of wind turbine noise reduction as described herein.

As used herein, the term processor is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but not be limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Processor 202 and other processors (not shown) as described herein process information transmitted from a plurality of electrical and electronic devices that may include, but not be limited to, blade pitch position feedback devices 206 (described further below) and electric power generation feedback devices (not shown). RAM and storage devices (not shown) store and transfer information and instructions to be executed by processor 202. RAM and storage devices can also be used to store and provide temporary variables, static (i.e., non-changing) information and instructions, or other intermediate information to processor 202 during execution of instructions by processor 202. Instructions that are executed include, but are not limited to, resident blade pitch system 200 control commands. The execution of sequences of instructions is not limited to any specific combination of hardware circuitry and software instructions.

In the exemplary embodiment, at least a portion of pitch control system 200 including, but not limited to, processor 202 is positioned within control panel 150. Moreover, processor 202 is coupled to blade pitch drive motors 131 via at least one I/O conduit 204. I/O conduit 204 includes any number of channels having any architecture including, but not limited to, Cat 5/6 cable, twisted pair wiring, and wireless communication features. Pitch control system 200 may include distributed and/or centralized control architectures, or any combination thereof.

Pitch control system 200 also includes a plurality of independent blade pitch position devices 206 coupled with processor 202 via at least one I/O conduit 204. In the exemplary embodiment, each pitch drive mechanism 130 is associated with a single blade pitch position feedback device 206. Alternatively, any number of position feedback devices 206 are associated with each mechanism 130. Therefore, in the exemplary embodiment, mechanism 130 and associated drive motor 131, as well as device 206, are included in system 200 as described herein. Each position feedback device 206 measures a pitch position of each blade 112, or more specifically an angle of each blade 112 with respect to wind 124 (shown in FIG. 1) and/or with respect to rotor hub 110. Position feedback device 206 is any suitable sensor having any suitable location within or remote to wind turbine 100, such as, but not limited to, optical angle encoders, magnetic rotary encoders, and incremental encoders, or some combination thereof. Moreover, position feedback device 206 transmits pitch measurement signals (not shown) that are substantially representative of associated blade 112 pitch position to processor 202 for processing thereof.

Figure 3:
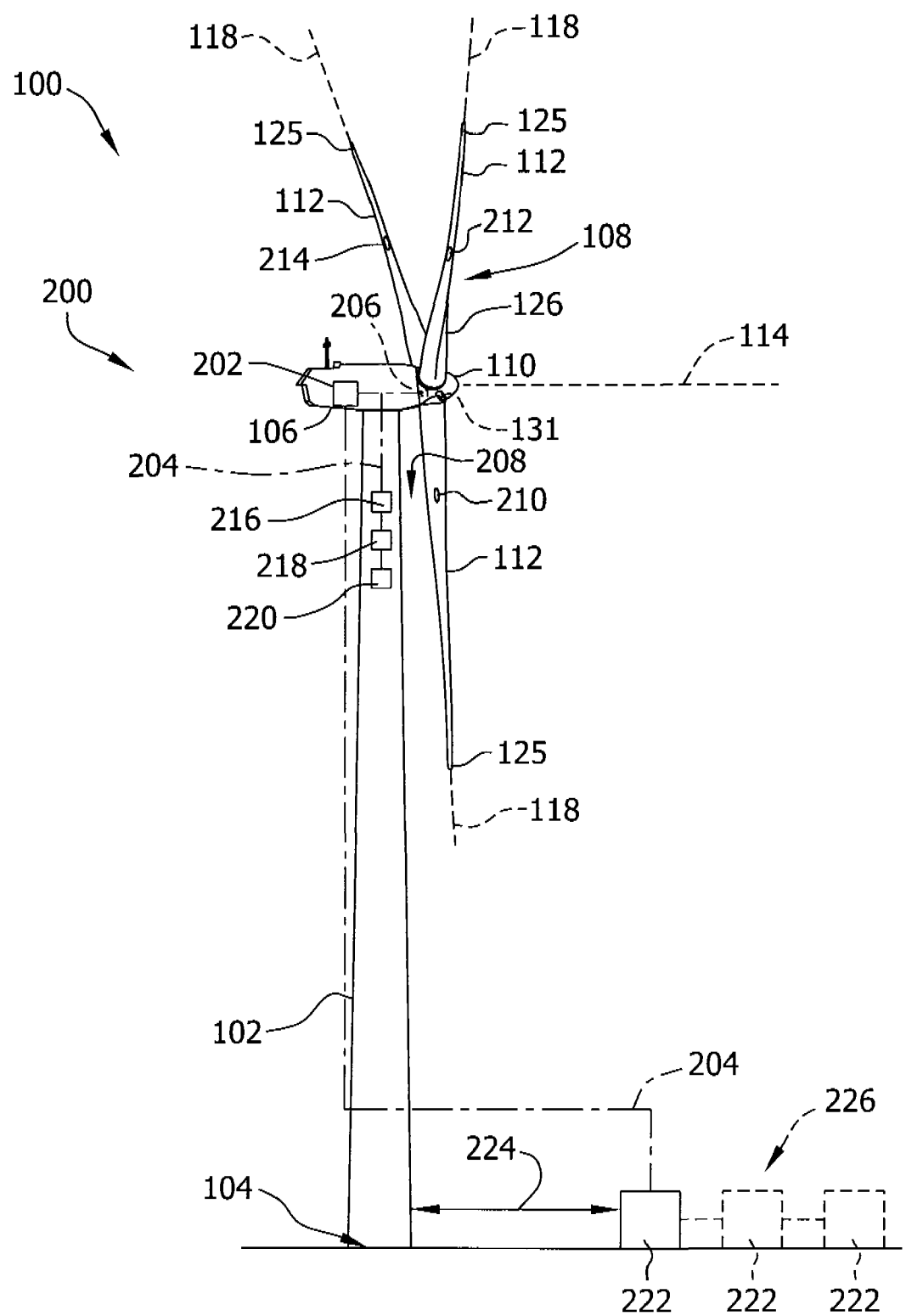
FIG. 3 is a schematic view of an exemplary blade pitch control system that may be used with the wind turbine generator shown in FIG. 1.

FIG. 3 is a schematic view of exemplary blade pitch control system 200. In addition to processor 202 and blade pitch position feedback devices 206, system 200 also includes a blade azimuth measurement system 208. Blade azimuth measurement system 208 includes at least one transponder, that is a plurality of radio frequency identification-type (RFID-type) transponders 210, 212, and 214. Each of transponders 210, 212, and 214 is coupled to one blade 112. Blade azimuth measurement system 208 also includes a plurality of receivers 216, 218, and 220 positioned within tower 102. Transponder 210 is tuned to transmit a predetermined signal (not shown) with predetermined signal parameters that include, but are not limited to, frequency and amplitude. Receiver 216 is positioned within tower 102 and is coupled with, that is tuned to receive signals from, transponder 210. Transponders 212 and 214 are similarly paired with receivers 218 and 220, respectively. In the exemplary embodiment, receivers 216, 218, and 220 are positioned at differing heights within tower 102, wherein transponders 210, 212, and 214 are positioned at differing longitudinal points along associated blades 112.

Positioning transponders 210, 212, and 214, and receivers 216, 218, and 220 as described above enables transponder 210 and receiver 216 to interact with each other while providing separation of transponder 210 and receiver 216 from receivers 218 and 220 to reduce a potential for interaction of transponder 210 with receivers 218 and 220. Similarly, such positioning enables transponder 212 and receiver 218 to interact with each other while providing separation of transponder 212 and receiver 218 from receivers 216 and 220 to reduce a potential for interaction of transponder 212 with receivers 216 and 220. Also, similarly, such positioning enables transponder 214 and receiver 220 to interact with each other while providing separation of transponder 214 and receiver 220 from receivers 216 and 218 to reduce a potential for interaction of transponder 214 with receivers 216 and 218. Alternatively, a potential for undesired interaction between transponders 210, 212, and 214 with receivers 216, 218, and 220 is further reduced by assigned a predetermined frequency separation between such transponders 210, 212, and 214 and receivers 216, 218, and 220. Each of receivers 216, 218, and 220 is coupled to processor 202 via conduit 204 such that three individual channels (not shown) are formed.

In the exemplary embodiment, the technical effect of positioning and/or forming a predetermined frequency separation of transponders 210, 212, and 214 and receivers 216, 218, and 220 as described above is that movement of blade 112 with transponder 210 coupled induces a response in receiver 216 as such blade 112 and transponder 210 rotate by receiver 216.

Such response in receiver 216 generates an electronic signal (not shown) that is substantially representative of a position of blade 112 with transponder 210. That signal is transmitted to processor 202, wherein processor 202 receives such electronic signal. Processor 202 also includes sufficient I/O channels (not shown) within conduit 204 such that processor 202 receives an electronic signal (not shown) that is substantially representative of a speed of rotor 108. Moreover, processor 202 is programmed to determine a position of blade 112 with transponder 210 as a function of time in a substantially continuous manner. Similar technical effects are formed via transponders 212 and 214 and receivers 218 and 220. Alternatively, any orientation and configuration of blade azimuth measurement system 208, any programming of processor 202, and any configuration of I/O conduit 204 with respect to processor 202 are used that enables system 200 to function as described herein.

Also, alternatively, any blade position sensing technology that enables system 200 to operate as described herein is used. Such technology includes, but is not limited to, optical rotary, or shaft encoders and proximity sensors. For example, a shaft encoder (not shown) may be coupled to low speed shaft 134 at or near gear box 136 (both shown in FIG. 2). Such shaft encoder is an electro-mechanical device that senses an angular position of at least a portion of shaft 134 and generates an analog or digital signal substantially representative of such angular position. For wind turbine generators such as wind turbine 100 that includes three blades 112, three shaft encoders may be positioned at approximately those portions of shaft 134 approximating a substantially similar position of blades 112 about rotor 108.

Further, alternatively, for example, a proximity sensor (not shown) may be coupled to a stationary portion of wind turbine generator 100 that at least partially circumscribes and/or encloses low speed shaft 134. Moreover, three markings are placed on shaft 134 at approximately 120° apart from each other in both phase directions, wherein each marking substantially represents a position of each associated blade 112 about rotor 108. As shaft 134 rotates, each marking traverses past the proximity sensor, wherein a coupling between each marking and the sensor generates a reset signal for an associated blade position algorithm. The algorithm includes at least one input for current shaft speed and generates a position signal as a function of such shaft speed and time lapse since the most recent reset. Position for each blade 112 is calculated in a substantially similar manner.

Also, in the exemplary embodiment, system 200 further includes at least one external sound measurement device, or microphone 222 positioned a predetermined distance 224 from tower 102. Alternatively, system 200 includes a plurality of microphones 222 oriented in a predetermined array 226. Further, alternatively, system 200 includes any number of microphones 222 arrayed in any orientation that enables system 200 to function as described herein. Microphone 222 is coupled to processor 202 via I/O conduit 204 and generates an electronic signal (not shown) that is substantially representative of acoustic emissions (not shown) emanating from each of blades 112 as they rotate about axis 114.

In the exemplary embodiment, a technical effect of microphone 222 is to generate and transmit signals (not shown) to processor 202 that are substantially representative of broadband and/or narrowband features of the acoustic emissions emanating from each of blades 112 including, but not limited to, approximate frequency and amplitude values. Also, in the exemplary embodiment, processor 202 associates such signals transmitted from microphone 222 with an appropriate blade 112, wherein processor 202 generates an acoustic emissions' profile (not shown) for each of blades 112. Further, in the exemplary embodiment, processor 202 integrates such individual profiles of blades 112 to generate a wind turbine acoustic emissions' profile (not shown in FIG. 3). Additional data collected may include, but not be limited to, electric power generation demand and wind speed and wind direction, all as a function of time. Moreover, in the exemplary embodiment, the acoustic emissions' signals generated by microphone 222 are used by processor 202 as trimming signals as described further below.

Figure 4:
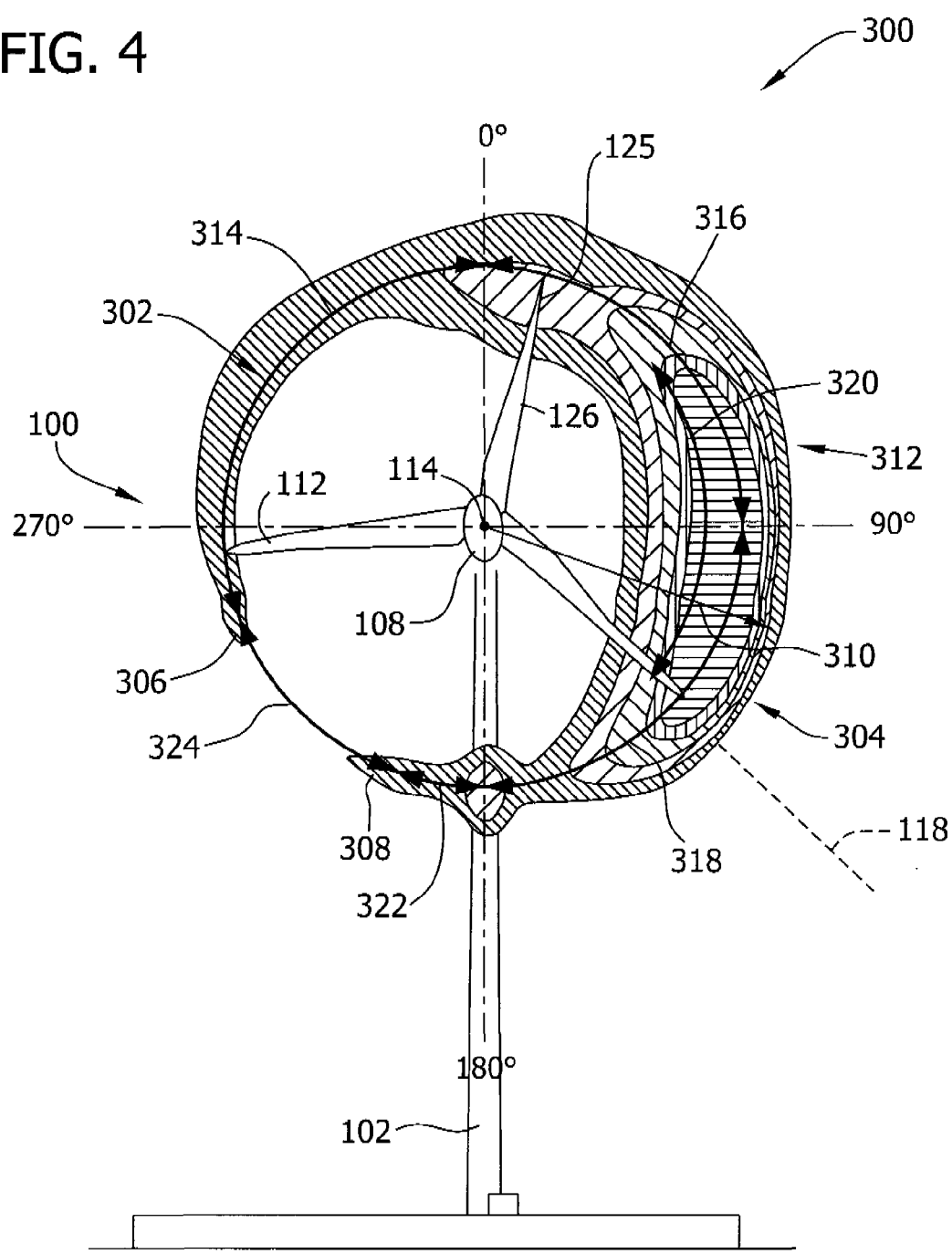
FIG. 4 is a pictorial view of an acoustic emissions' profile that may be generated by the wind turbine generator shown in FIG. 3.
Figure 4:
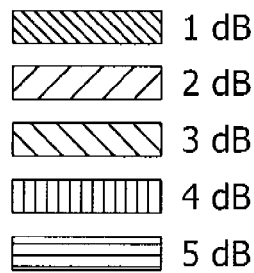

FIG. 4 is a pictorial view of an acoustic emissions' profile 300 that may be generated by wind turbine generator 100. A 360° blade rotational travel path, or blade azimuth 302, that includes angular rotation values of 0°, 90°, 180°, and 270°, is illustrated for reference. Profile 300 includes an acoustic emissions envelope 304 that is at least partially defined by a first angular position 306 extending in a clockwise direction to a second angular position 308. First angular position 306 has a value in the range of approximately 225° to approximately 270° and, in the exemplary embodiment, first angular position has a value of approximately 250°. Second angular position 308 has a value in the range of approximately 180° to approximately 225° and, in the exemplary embodiment, second angular position 308 has a value of approximately 200°.

Envelope 304 extends a radial distance 310 from rotation axis 114. Moreover, envelope 304 substantially represents amplitude values of acoustic emissions in units of dB above at least one baseline value. More specifically, envelope 304 at least partially defines an acoustic emissions' amplitude profile 312, wherein associated acoustic emissions' amplitude levels are a function of parameters that include, but are not limited to, a position of blades 112 along blade azimuth 302, a position along radial distance 310, a frequency spectrum under consideration, baseline acoustic emissions' values, a linear speed of blade tip portions 125, Doppler shift values, and a percentage of blade surface area 126 exposed to wind 124 (shown in FIG. 1).

Moreover, in general, acoustic emissions generated by wind turbine generator 100 are primarily associated with rotation of blades 112 through wind 124 (shown in FIG. 1). Specifically the acoustic emissions are dominated by an outer portion (not shown) of blades 112 that approaches blade tip portions 125. Furthermore, down-going blades 112 are dominant with respect to acoustic emissions for all frequencies. Specifically, acoustic emissions' amplitudes generated by blades 112 between the 0° and 180° positions along blade azimuth 302 are greater than acoustic emissions' amplitudes generated between the 180° and 0° positions. More specifically, as each blade 112 rotates downward from the angular position value of 0° to the angular position value of 180° along blade azimuth 302, measured acoustic emissions are approximately 1 dB to approximately 2 dB greater than measured acoustic emissions recorded as each blade rotates upward from the angular position value of 180° to the value of 0°. Such acoustic emissions' dominance is fundamentally due to external microphones 222 being positioned on tower supporting surface 104 (both shown in FIG. 3) and such that blades 112 approach, and subsequently recede from, microphone 222 (shown in FIG. 3).

In the exemplary embodiment, a technical effect of system 200 is to modulate a pitch angle of blades 112 about pitch axis 118, thereby modulating a percentage of blade surface area 126 exposed to wind 124, subsequently modulating blade lift forces induced on blades 112 and a rotational speed of rotor 108, thereby modulating a linear speed of blade tip portions 125, and ultimately modulating an acoustic emissions' amplitude level.

In the exemplary embodiment, acoustic emissions' amplitude profile 312 includes a first region 314 that extends from approximately a 250° position to approximately the 0° position along blade azimuth 302. First region 314 includes first angular position 306. Also, in the exemplary embodiment, first region 314 substantially represents an increasing acoustic emissions amplitude level that is in the range of approximately 0 dB to approximately 2 dB above a predetermined baseline value as blades 112 rotate upward from approximately the 250° position clockwise to approximately the 0° position along blade azimuth 302. Hereon, discussions with respect to dB levels associated with wind turbine acoustic emissions substantially represent those associated with the exemplary wind turbine generator 100. Alternatively, depending on the model of wind turbine generator being used, such acoustic emissions within first region 314 may range approximately 0 dB to 3 dB above the baseline values. Also, alternatively, depending on the model of wind turbine generator being used, similar dB levels may exceed those stated for the exemplary embodiment by 1 dB to 2 dB, or more. However these dB levels form no limitations to the instant disclosure.

Also, in the exemplary embodiment, profile 312 includes a second region 316 that extends from approximately the 0° position to approximately the 90° position along blade azimuth 302. Second region 316 substantially represents an increasing acoustic emissions' amplitude level that is in the range of approximately 2 dB to approximately 5 dB above a predetermined baseline value as blades 112 rotate downward from approximately the 0° position to approximately the 90° position along blade azimuth 302.

Further, in the exemplary embodiment, profile 312 includes a third region 318 that extends from approximately the 90° position to approximately the 180° position along blade azimuth 302. Third region 318 substantially represents a decreasing acoustic emissions' amplitude level that is in the range of approximately 5 dB to approximately 2 dB above a predetermined baseline value as blades 112 rotate downward from approximately the 90° position to approximately the 180° position along blade azimuth 302. Second region 316 and third region 318 cooperate to define a fourth region 320. Fourth region 320 substantially represents acoustic emissions' amplitude peak values that are in the range of approximately 4 dB to approximately 5 dB above a predetermined baseline value as blades 112 rotate downward from approximately a 45° position to approximately a 135° position along blade azimuth 302.

Also, in the exemplary embodiment, profile 312 includes a fifth region 322 that extends from approximately the 180° position to approximately a 200° position along blade azimuth 302. Fifth region 322 substantially represents a decreasing acoustic emissions' amplitude level that is in the range of approximately 2 dB to approximately 0 dB above a predetermined baseline value as blades 112 rotate upward from approximately the 180° position clockwise to approximately the 200° position along blade azimuth 302. Fifth region 322 includes second angular position 308. First 306 and second 308 angular positions define a sixth region 324 of blade azimuth 302 that substantially represents an acoustic emissions' amplitude level that is approximately 0 dB above a predetermined baseline value as blades 112 rotate upward from approximately the 200° position clockwise to approximately the 250° position along blade azimuth 302.

Figure 5:
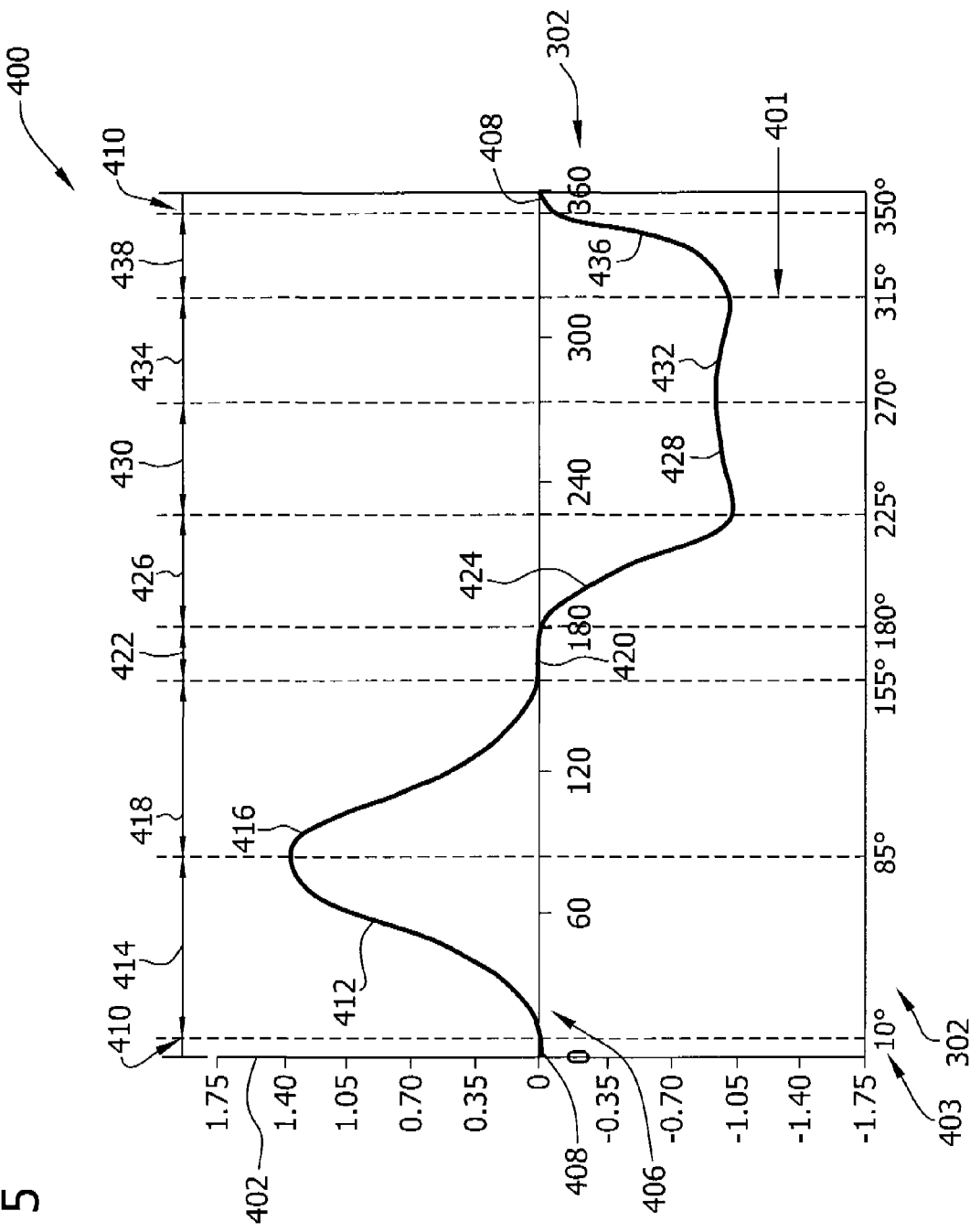
FIG. 5 is a graphical view of an exemplary blade pitch angle control strategy for a single blade that may be used with the wind turbine generator shown in FIG. 3.

FIG. 5 is a graphical view, or graph 400 of an exemplary blade pitch angle control strategy for a single blade that may be used with wind turbine generator 100 (shown in FIG. 3). Graph 400 includes an ordinate, or y-axis 402, wherein y-axis 402 is substantially representative of a pitch angle compensation of blade 112 and is divided into units of angular degrees, or °, in 0.35° increments from +1.75° to −1.75°. Graph 400 also includes an abscissa, or x-axis 404, wherein x-axis 404 is substantially representative of blade azimuth 302 and is divided into units of angular degrees, or °, in 60° increments from 0° to 360°. Graph 400 further includes a plurality of vertical dashed lines 401 corresponding to a plurality of incremental points 403 associated with blade azimuth 302. In FIG. 5, for perspective, blade azimuth 302 is oriented substantially straight and vertically as contrasted to substantially circular as shown in FIG. 4.

Graph 400 further includes a blade pitch angle compensation curve 406. In the exemplary embodiment, blade pitch angle compensation curve 406 substantially represents an exemplary programming of a plurality of blade pitch angle compensation command signals (not shown) within processor 202 (shown in FIG. 2), wherein such signals are transmitted from processor 202 to pitch drive motor 131 via a portion of I/O conduit 204 (both shown in FIG. 2). Similarly, curve 406 also substantially represents a compensatory positioning of blade 112 with a predetermined blade pitch angle compensation value as described further below.

Also, in the exemplary embodiment, such blade pitch angle compensation command signals are combined with other blade pitch command signals (not shown) to shift a pitch angle (not shown) of blade 112 to a predetermined position, thereby facilitating inducing predetermined blade lift forces as a function of wind 124 (shown in FIG. 1). More specifically, processor 202 generates and transmits electronic signals that substantially represent a command for a predetermined pitch angle and induced blade forces as a function of a plurality of input signals to processor 202 that include, but are not limited to, electric power generation demands and rotor 108 rotational speed constraints. Therefore, processor 202 combines blade pitch angle compensation command signals as represented by curve 406 with all other blade pitch command signals to position blades 112 about axis 118.

Blade pitch angle compensation curve 406 includes a first portion 408 that is defined between a first azimuthal range 410 of approximately 350° to approximately 10° along blade azimuth 302. First portion 408 substantially represents a blade pitch compensation of approximately 0° about pitch axis 118 (shown in FIG. 4). That is, processor 202 generates and transmits a blade pitch command signal to drive motor 131 that substantially represents an output in response to a plurality of inputs that include, but are not limited to, electric power generation demands and rotor 108 rotational speed constraints, as blade 112 rotates through approximately 350° and approximately 10° along blade azimuth 302.

Blade pitch angle compensation curve 406 also includes a second portion 412 that is defined between a second azimuthal range 414 of approximately 10° to approximately 85° along blade azimuth 302. Second portion 412 substantially represents a change of the blade pitch angle compensation command signal, wherein such change corresponds to an increase of the blade pitch angle by approximately 1.4° from a previous pitch angle. Such a pitch angle change occurs throughout range 414 of rotational travel of blade 112 along blade azimuth 302 between approximately 10° to approximately 85°. That is, processor 202 generates and transmits a blade pitch command signal to drive motor 131 that substantially represents a blade pitch angle command in response to a plurality of inputs that include second portion 412 as well as, but not limited to, electric power generation demands and rotor 108 rotational speed constraints. Specifically, as blade 112 rotates from approximately 10° to 85° along blade azimuth 302, blade 112 increases a pitch angle by approximately 1.4° from a previous pitch angle that existed as blade 112 rotated between approximately 350° and approximately 10° along blade azimuth 302.

Blade pitch angle compensation curve 406 further includes a third portion 416 that is defined between a third azimuthal range 418 of approximately 85° to approximately 155° along blade azimuth 302. Third portion 416 substantially represents a change of the blade pitch angle compensation command signal that corresponds to a decrease of the blade pitch angle by approximately 1.4° in range 418 along blade azimuth 302 between approximately 85° to approximately 155°. Specifically, as blade 112 rotates from approximately 85° to approximately 155° along blade azimuth 302, blade 112 decreases the pitch angle by approximately 1.4° such that a pitch angle that existed as blade 112 rotated between approximately 350° and approximately 10° along blade azimuth 302 is substantially attained.

Blade pitch angle compensation curve 406 also includes a fourth portion 420 that is defined between a fourth azimuthal range 422 of approximately 155° to approximately 180° along blade azimuth 302. Fourth portion 420 substantially represents a blade pitch compensation of approximately 0° about pitch axis 118. That is, processor 202 generates and transmits a blade pitch command signal to drive motor 131 that is substantially similar to that described above for first portion 408.

Blade pitch angle compensation curve 406 further includes a fifth portion 424 that is defined between a fifth azimuthal range 426 of approximately 180° to approximately 225° along blade azimuth 302. Fifth portion 424 substantially represents a change of the blade pitch angle compensation command signal, wherein such change initially corresponds to a decrease of blade pitch angle by approximately 1.0° from a previous blade pitch angle value as blade 112 rotates through range 426 along blade azimuth 302 between approximately 180° to approximately 225°. That is, processor 202 generates and transmits a blade pitch command signal to drive motor 131 that substantially represents a blade pitch angle command in response to a plurality of inputs that include fifth portion 424 as well as, but not limited to, electric power generation demands and rotor 108 rotational speed constraints. Specifically, as blade 112 rotates from approximately 180° to approximately 225° along blade azimuth 302, blade 112 decreases a pitch angle by approximately 1.0° from a previous pitch angle that existed as blade 112 rotated between approximately 155° and approximately 180° along blade azimuth 302.

Blade pitch angle compensation curve 406 also includes a sixth portion 428 that is defined between a sixth azimuthal range 430 of approximately 225° to approximately 270° along blade azimuth 302. Sixth portion 428 substantially represents a change of the blade pitch angle compensation command signal, wherein such change initially corresponds to an increase of blade pitch angle by approximately 0.1° from a previous blade pitch angle value as blade 112 rotates through range 430 along blade azimuth 302 between approximately 225° to approximately 270°. That is, processor 202 generates and transmits a blade pitch command signal to drive motor 131 that substantially represents a blade pitch angle command in response to a plurality of inputs that include sixth portion 428 as well as, but not limited to, electric power generation demands and rotor 108 rotational speed constraints. Specifically, as blade 112 rotates from approximately 225° to approximately 270° along blade azimuth 302, blade 112 increases a pitch angle by approximately 0.1° from a previous pitch angle that existed as blade 112 rotated through approximately 225° along blade azimuth 302.

Blade pitch angle compensation curve 406 further includes a seventh portion 432 that is defined between a seventh azimuthal range 434 of approximately 270° to approximately 315° along blade azimuth 302. Seventh portion 432 substantially represents a substantially represents a change of the blade pitch angle compensation command signal, wherein such change initially corresponds to a decrease of blade pitch angle by approximately 0.1° from a previous blade pitch angle value as blade 112 rotates through range 434 along blade azimuth 302 between approximately 270° to approximately 315°. That is, processor 202 generates and transmits a blade pitch command signal to drive motor 131 that substantially represents a blade pitch angle command in response to a plurality of inputs that include seventh portion 432 as well as, but not limited to, electric power generation demands and rotor 108 rotational speed constraints. Specifically, as blade 112 rotates from approximately 270° to approximately 315° along blade azimuth 302, blade 112 decreases a pitch angle by approximately 0.1° from a previous pitch angle that existed as blade 112 rotated through approximately 270° along blade azimuth 302.

Blade pitch angle compensation curve 406 further includes an eighth portion 436 that is defined between an eighth azimuthal range 438 of approximately 315° to approximately 350° along blade azimuth 302. Eighth portion 436 substantially represents a change of the blade pitch angle compensation command signal that corresponds to an increase of blade pitch angle by approximately 1.0° from a previous blade pitch angle as blade 112 rotates through range 438 along blade azimuth 302 between approximately 315° to approximately 350°. Specifically, as blade 112 rotates from approximately 315° to 350° along blade azimuth 302, blade 112 increases pitch angle by approximately 1.0° such that the pitch angle that existed at approximately 155° and approximately 180° along blade azimuth 302 is substantially attained.

Exemplary blade pitch angle compensation values as a function of a rotational position of blade 112 are provided above. Alternatively, any blade pitch compensation values for any azimuthal position of blade 112 are used that enable blade pitch control system 200 to function as described herein.

In the exemplary embodiment, blade pitch adjustments as defined by blade pitch angle compensation curve 406 are consistently applied to a first blade 112 as first blade 112 travels through a 360° rotational path as defined by blade azimuth 302. Moreover, such blade pitch adjustments are applied to a remainder of blades 112, wherein, in the exemplary embodiment, there are two additional blades 112 positioned apart from each other and first blade 112 by approximately a 120° arc along rotor 108 and blade azimuth 302. Therefore, each blade 112 changes pitch angle according to curve 406 120° out of phase with any adjacent blade 112. Alternatively, each blade 112 has a unique set of blade pitch compensation values for rotational positions of blade 112 that enables blade pitch control system 200 to function as described herein.

An exemplary method of operating wind turbine generator 100 includes increasing a pitch angle of wind turbine blade 112 as wind turbine blade 112 rotates through azimuthal range 414 of blade azimuth values 302, thereby reducing acoustic emissions generated by wind turbine generator 100. The method also includes decreasing a pitch angle of wind turbine blade 112 as wind turbine blade 112 rotates through azimuthal range 430 of blade azimuth values 302, thereby increasing electric power generated by wind turbine generator 100.

Figure 6:
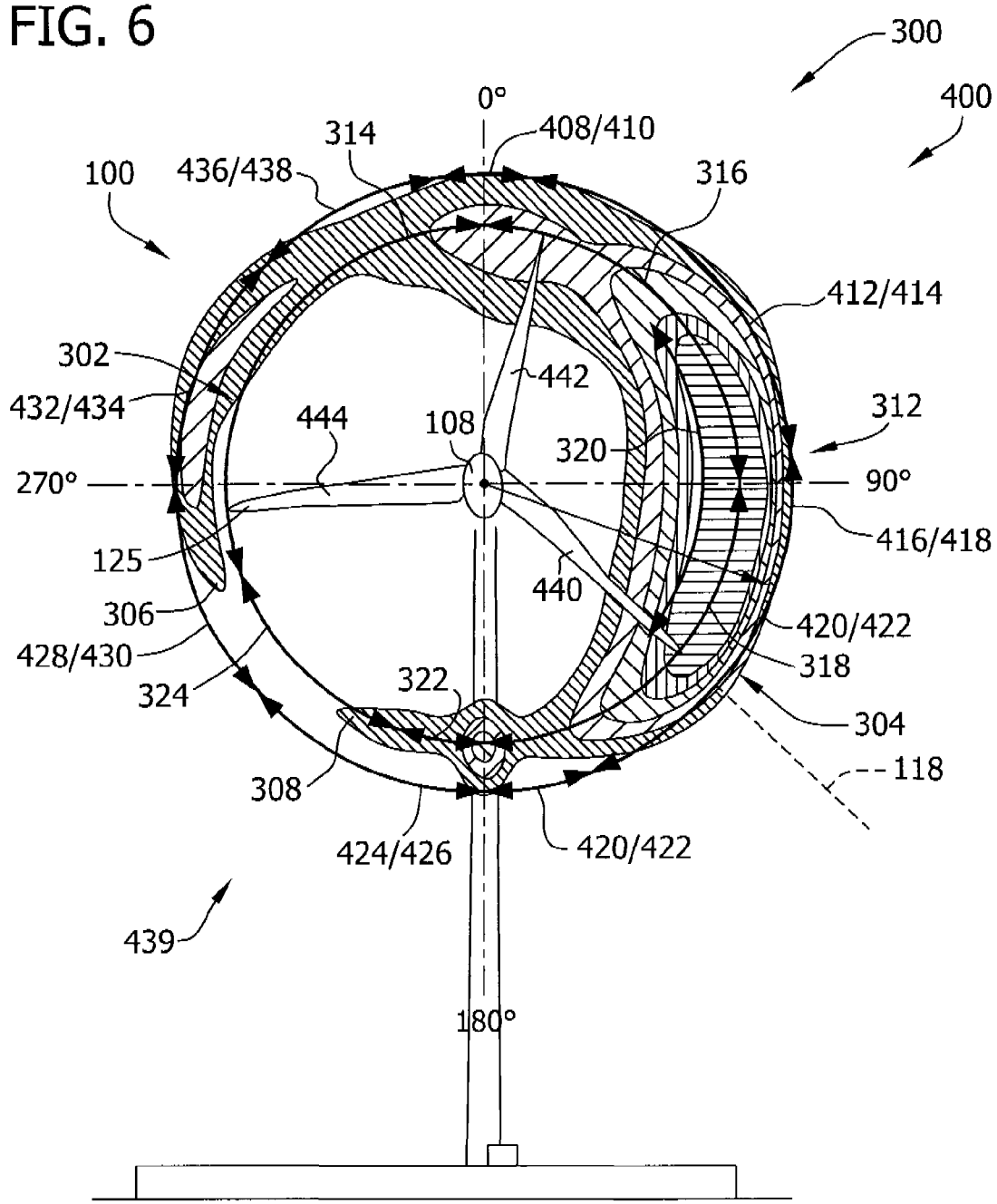
FIG. 6 is a pictorial composite view of a portion of the blade pitch angle control strategy shown in FIG. 5 and the acoustic emissions' profile shown in FIG. 4.

FIG. 6 is a pictorial composite view 439 of a portion of blade pitch angle control strategy 400 and acoustic emissions' profile 300, wherein acoustic emissions' amplitude profile 312 is associated with blade pitch angle compensation curve 406 (shown in FIG. 5). Specifically, FIG. 6 illustrates a relationship between acoustic emissions' amplitude profile 312 and blade pitch angle compensation curve 406 (shown in FIG. 5). More specifically, FIG. 6 illustrates a relationship between regions 314, 316, 318, 320, 322, and 324 of profile 312 with portions 408, 412, 416, 420, 424, 428, 432, and 436 of curve 406 (shown in FIG. 5) and associated azimuthal ranges 410, 414, 418, 422, 426, 430, 434, and 438, respectively.

In the exemplary embodiment, wind speeds of approximately 3 meters per second (m/s) (6.7 miles per hour (mph)) to approximately 25 m/s (55.9 mph) are associated with electric power generation values of approximately 0 megawatts (MW) and approximately 1.5 MW. Alternatively, any wind speed and any electric power generation ranges are associated with any wind turbine generator that enables operation of blade pitch control system 200 as described herein.

During operation, wind 124 (shown in FIG. 1) impinges each of blades 440, 442, and 444 along blade surface area 126 (shown in FIG. 1), wherein each of blades 440, 442, and 444 are substantially similar to blades 112 (shown in FIGS. 1, 3, and 4). Hereon, unless otherwise discussed, operation of blade 440 is discussed, wherein operation of blades 442 and 444 are substantially similar. Such impingement induces rotational forces in each of blades 112, wherein such rotational forces are transferred to rotor 108. Rotor 108 drives generator 132 to generate electric power. A rotational speed of rotor 108 and electric power generation of generator 132 are proportional to induced blade lift forces as a function of wind 124. As the induced blade lift forces increases, greater rotational forces are induced via blade 440 and rotor 108 accelerates and/or electric power production via generator 132 increases. Induced blade lift forces are modulated by adjusting a pitch angle (not shown) of blade 440 wherein decreasing a pitch angle of blade 440 increases induced blade lift forces. Conversely, increasing a pitch angle of blade 440 decreases induced blade lift forces, thereby facilitating a deceleration of blade 440 and/or a reduction in electric power generation via generator 132.

Also, during operation, rotation of blade 440 induces formation of acoustic emissions' profile 300 as described above, wherein profile 300 includes acoustic emissions' amplitude profile 312 that further includes acoustic emissions' amplitudes between 0 dB and 5 dB above a predetermined baseline value. In general, increasing pitch angles of blade 440 and thereby decreasing induced blade lift forces facilitates a reduction in an amplitude of acoustic emissions.

Further, during operation, a technical effect of using blade pitch control system 200 includes modulating a pitch angle of blade 440 as defined herein. Modulating a pitch angle as described herein thereby modulates induced blade lift forces on blade 440. Modulating induced blade lift forces as described herein effectively decreases a dB level of acoustic emissions, or noise, being generated while facilitating generation of electric power within a predetermined range.

Also, during operation, processor 202 (shown in FIG. 2) receives a plurality of input signals (not shown) from devices that include, but are not limited to, electric power generation devices (not shown), rotor speed measurement devices (not shown), blade pitch position feedback devices 206, blade azimuth measurement system 208, and external microphone 222 (all shown in FIG. 3). Predetermined programming within processor 202 cooperates with blade azimuth measurement system 208 and the rotor speed measurement devices to determine a position of blade 440 within blade azimuth 302. Moreover, additional predetermined programming within processor 202, including, but not limited to, blade pitch angle compensation curve 406, cooperates with pitch drive motors 131 (shown in FIG. 2) and blade pitch position feedback devices 206 to modulate a pitch angle of blade 440 thereby modulating a percentage of area 126 of blade 440 exposed to wind 124, and further modulating a rotational speed of rotor 108 and/or generation of electric power of generator 132. External microphone 222 receives acoustic emissions from wind turbine 100 and generates a trimming signal (not shown and described further below) that facilitates either an increase or decrease in the pitch compensation values applied to blade 440.

Further, during operation, blade 440 rotates in a clockwise direction about blade azimuth 302. Blade pitch control system 200 positions blade 440 with a predetermined pitch angle that facilitates a plurality of predetermined operating parameters that includes, but is not limited to, a predetermined range of electric power generation. As blade 440 rotates into approximately the 350° position and transits through first azimuthal range 410 to approximately the 10° position, processor 202 generates a pitch angle command signal according to first portion 408 of blade pitch angle compensation curve 406 (shown in FIG. 5) that is substantially representative of a pitch angle compensation value of approximately 0°. First portion 408 corresponds to a portion of first region 314 and a portion of region 316 of acoustic emissions' profile 312, wherein acoustic emissions' amplitudes increase from approximately 1 dB to approximately 3 dB. Therefore, in the exemplary embodiment, system 200 does not use a positive blade pitch angle compensation for acoustic emissions with amplitudes less than approximately 3 dB, wherein such amplitudes are known to typically be generated for a given set of predetermined parameters that include, but are not limited to, linear speed of blade tip portion 125, wind conditions, and electric power generation.

As discussed above, microphone 222 (shown in FIG. 3) receives the acoustic emissions generated by wind turbine generator 100. Microphone 222 subsequently generates electronic signals and transmits them to processor 202, wherein such signals are substantially representative of the amplitudes of such acoustic emissions. The acoustic emissions' signals generated by microphone 222 are used by processor 202 to generate trimming signals, wherein such signals are used to adjust the blade pitch angle compensation values as described herein. As an example, but not limited to, for acoustic emissions with amplitudes above a threshold value, the compensation of blade pitch angles is increased from 1.4° to 2.0°. Similarly, for acoustic emissions with amplitudes below a threshold value, the compensation of blade pitch angles is decreased from 1.4° to a predetermined lower value. Therefore, microphone 222, in conjunction with processor 202, facilitates in-situ real-time control of acoustic emissions generated by wind turbine generator 100. Such use of trimming signals may be applied throughout travel of blade 440 about blade azimuth 302 as described herein.

Also, during operation, blade 440 rotates into approximately the 10° position and transits through second azimuthal range 414 to approximately the 85° position, wherein processor 202 generates a pitch angle command signal according to second portion 412 of curve 406 that is substantially representative of a pitch angle compensation value that shifts from approximately 0° to approximately +1.4°. As the pitch angle of blade 440 increases by 1.4°, lift forces induced on blade 440 decrease, and blade tip portion 125 decelerates. Second portion 412 corresponds to a portion of second region 316 and a portion of region 320 of acoustic emissions' profile 312, wherein acoustic emissions' amplitudes increase from approximately 3 dB to approximately 5 dB and such acoustic emissions' amplitudes are substantially constant at approximately 5 dB. Therefore, in the exemplary embodiment, system 200 does not use blade pitch angle compensation for acoustic emissions with threshold amplitude values less than approximately 3 dB. Alternatively, any threshold amplitude values that enable system 200 to function as described herein are used. Trimming signals as described above may be used.

In the exemplary embodiment, as blade pitch angle shifts an additional +1.4°, blade tip portion 125 decelerates sufficiently to facilitate an amplitude decrease of the acoustic emissions in a range of approximately 1.5 dB to 2.0 dB. Such deceleration also facilitates a decrease in the energy transfer from wind to electric power, as described above, associated with the blade 440 that is associated with the blade pitch angle shift as described above. In the exemplary embodiment, overall electric power generation by wind turbine generator 100 is maintained in a predetermined range during the blade pitch angle compensation shifts as described herein. Also, in the exemplary embodiment, processor 202 is programmed to reduce acoustic emissions as a tiered highest priority and to generate electric power as tiered lower priority. Alternatively, processor 202 is programmed to facilitate maintaining electric power generation substantially close to electric power demand and to reduce acoustic emissions as a tiered lower priority.

Further, during operation, blade 440 rotates into approximately the 85° position and transits through third azimuthal range 418 to approximately the 155° position, wherein processor 202 generates a pitch angle command signal according to third portion 416 of curve 406 that is substantially representative of a pitch angle compensation value that that shifts from approximately +1.4° to approximately 0°. As the pitch angle of blade 440 decreases by 1.4°, lift forces induced on blade 440 begin to increase, and blade tip portion 125 begins to accelerate. Third portion 416 corresponds to a portion of second region 316, third region 318, and fourth region 320 of acoustic emissions' profile 312, wherein acoustic emissions amplitudes are substantially constant at approximately 5 dB and then such acoustic emissions' amplitudes decrease from approximately 5 dB to approximately 3 dB. Trimming signals as described above may be used.

Moreover, during operation, blade 440 rotates into approximately the 155° position and transits through fourth azimuthal range 422 to approximately the 180° position, wherein processor 202 generates a pitch angle command signal according to fourth portion 420 of curve 406 that is substantially representative of a pitch angle compensation value that of approximately 0°. Fourth portion 420 corresponds to a portion of third region 318 of acoustic emissions' profile 312, wherein acoustic emissions' amplitudes decrease from approximately 3 dB to approximately 2 dB. Trimming signals as described above may be used.

Also, during operation, blade 440 rotates into approximately the 180° position and transits through fifth azimuthal range 426 to approximately the 225° position, wherein processor 202 generates a pitch angle command signal according to fifth portion 424 of blade pitch angle compensation curve 406 that is substantially representative of a pitch angle compensation value that shifts from approximately 0° to approximately −1.0°. As the pitch angle of blade 440 decreases by 1.0°, lift forces induced on blade 440 begin to increase, and blade tip portion 125 begins to accelerate. Fifth portion 424 corresponds to fifth region 322 and at least a portion of sixth region 324 of acoustic emissions' profile 312, wherein acoustic emissions' amplitudes decrease from approximately 2 dB to approximately 0 dB. Trimming signals as described above may be used.

Further, during operation, blade 440 rotates into approximately the 225° position and transits through sixth azimuthal range 430 to approximately the 270° position, processor 202 generates a pitch angle command signal according to sixth portion 428 of curve 406 that is substantially representative of a pitch angle compensation value that shifts from approximately −1.0° to approximately −0.9°. As the pitch angle of blade 440 increases by 0.1°, lift forces induced on blade 440 decrease, and blade tip portion 125 decelerates. Sixth portion 428 corresponds to a portion of sixth region 324 of acoustic emissions' profile 312, wherein acoustic emissions' amplitudes remain substantially constant at approximately 0 dB and then begin to increase to 1 dB. Trimming signals as described above may be used.

Also, during operation, blade 440 rotates into approximately the 270° position and transits through seventh azimuthal range 434 to approximately the 315° position, processor 202 generates a pitch angle command signal according to seventh portion 432 of curve 406 that is substantially representative of a pitch angle compensation value that shifts from approximately −0.9° to approximately −1.0°. As the pitch angle of blade 440 decreases by 0.1°, lift forces induced on blade 440 increase, and blade tip portion 125 accelerates. Seventh portion 432 corresponds to a portion of first region 314 of acoustic emissions' profile 312, wherein acoustic emissions' amplitudes increase from approximately 1 dB to 2 dB. Trimming signals as described above may be used.

Further, during operation, blade 440 rotates into approximately the 315° position and transits through eighth azimuthal range 438 to approximately the 350° position, processor 202 generates a pitch angle command signal according to eighth portion 436 of curve 406 that is substantially representative of a pitch angle compensation value that shifts from approximately −1.0° to approximately 0°. As the pitch angle of blade 440 increases by 1.0°, lift forces induced on blade 440 decrease, and blade tip portion 125 decelerates. Eighth portion 436 corresponds to a portion of first region 314 of acoustic emissions' profile 312, wherein acoustic emissions' amplitudes decrease from approximately 2 dB to approximately 1 dB and remains substantially constant at approximately 1 dB. Trimming signals as described above may be used.

In the exemplary embodiment, the blade pitch angle control strategy, acoustic emissions' profile, and blade pitch angle compensation values for blades 442 and 444 are substantially similar to those associated with blade 440 with the exception of blades 442 and 444 being 120° out of phase with blade 440. Alternatively, each of blades 442 and 444 have a unique set of blade pitch angle control strategy, acoustic emissions' profile, and blade pitch angle compensation values that enable blade pitch control system 200 to function as described herein.

Figure 7:
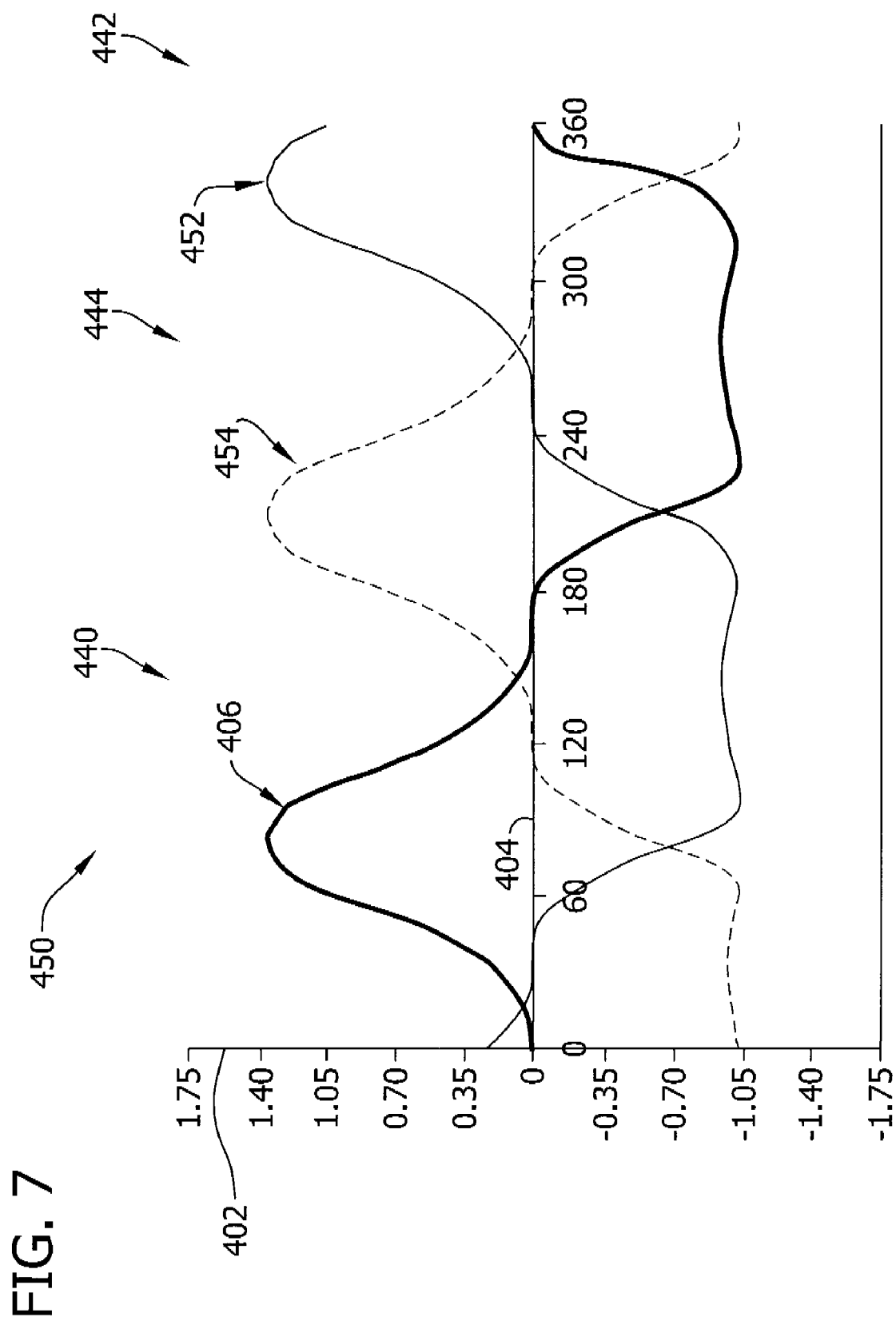
FIG. 7 is a graphical view of an exemplary blade pitch angle control strategy for three blades that may be used with the wind turbine generator shown in FIG. 6.

FIG. 7 is a graphical view, or graph 450 of an exemplary blade pitch angle control strategy for three blades 440, 442, and 444 that may be used with wind turbine generator 100 (shown in FIG. 3). Graph 450 includes y-axis 402 and x-axis 404 as shown in FIG. 5. Also, graph 450 includes blade pitch angle compensation curve 406 that is substantially representative of the programmed blade pitch angle scheme for blade 440. Further, graph 450 includes a blade pitch angle compensation curve 452 that is substantially representative of the programmed blade pitch angle scheme for blade 442. Moreover, graph 450 includes a blade pitch angle compensation curve 454 that is substantially representative of the programmed blade pitch angle scheme for blade 444.

In the exemplary embodiment, curves 452 and 454 are substantially similar to curve 406 with the exception of curves 452 and 454 being 120° out of phase with curve 406. Alternatively, each of curves 406, 452, and 454 have a unique set of blade pitch compensation values for rotational positions of blades 440, 442, and 444, respectively, that enables blade pitch control system 200 to function as described herein.

Figure 8:
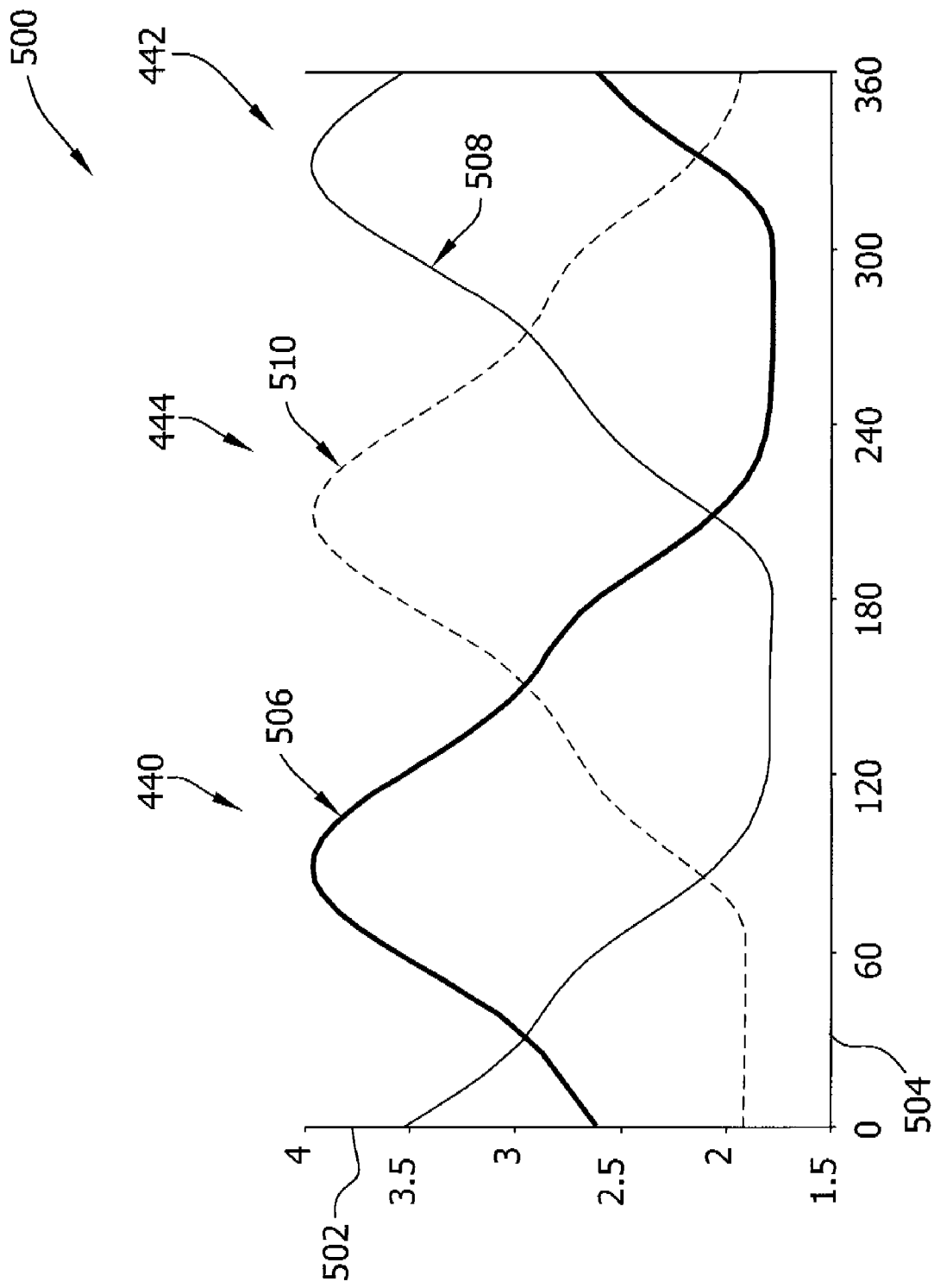
FIG. 8 is a graphical view of an exemplary blade pitch angle pattern for three blades that may be used with the wind turbine generator shown in FIG. 6.

FIG. 8 is a graphical view, or graph 500 of an exemplary blade pitch angle pattern for all three blades 440, 442, and 444 that may be used with wind turbine generator 100 (shown in FIG. 3). Graph 500 includes an ordinate, or y-axis 502, wherein y-axis 502 is substantially representative of an actual pitch angle measurement of each of blades 440, 442, and 444, and is divided into units of angular degrees, or °, in 0.5° increments from +1.5° to +4.0°. Graph 500 also includes an abscissa, or x-axis 504, wherein x-axis 504 is substantially representative of blade azimuth 302 (shown in FIG. 4) and is divided into units of angular degrees, or °, in 60° increments from 0° to 360° in a manner substantially similar to that of x-axis 404 (shown in FIG. 5). That is, in FIG. 8, for perspective, blade azimuth 302 is oriented substantially straight and vertically as contrasted to substantially circular as shown in FIG. 4.

Graph 500 substantially represents actual pitch angle measurements of one of each of blades 440, 442, and 444 as referenced to that of each other blade as a function of each of blades' 440, 442, and 444 position about blade azimuth 302. Graph 500 includes a first blade pitch angle pattern curve 506 that is substantially representative of an actual blade position feedback signal (not shown) associated with blade 440. Specifically, during operation, blade 440 changes its pitch angle from the approximately 2.6° value at approximately 0° azimuth to an approximately 4° pitch angle value as the 1.4° pitch angle compensation signal (not shown) is applied between azimuth values of approximately 10° to 85°.

Subsequently, during operation, blade 440 changes its pitch angle from an approximate 4° value at approximately 85° azimuth to approximately a 1.8° pitch angle value at approximately 225° azimuth as the pitch angle compensation signal is decreased from 1.4° to 0° between azimuth values of approximately 85° to 155°, and while the pitch angle compensation signal is held at an approximate value of 0° between azimuth values of approximately 155° and approximately 180°, and as the pitch angle compensation signal is further decreased to a range of values of approximately −1.0° to −0.9° between azimuth values of approximately 180° to approximately 225°. Also, subsequently, during operation, blade 440 maintains a pitch angle within a range of values of approximately 1.7° to 1.8° as the pitch angle compensation value is maintained in a range of values of approximately −1.0° to −0.9° between azimuth values of approximately 180° to approximately 225°.

Further, during operation, blade 440 changes its pitch angle from an approximate 1.8° value at approximately a 315° azimuth to approximately a 2.6° pitch angle value at approximately a 350° azimuth as the pitch angle compensation signal is increased from approximately −1.0° to approximately 0° between azimuth values of approximately 315° to 350°. Also, during operation, blade 440 maintains its pitch angle at the approximately 2.6° value between approximately 350° azimuth to approximately 10° as a 0° pitch angle compensation signal is applied between azimuth values of approximately 350° to 10°. In the exemplary embodiment, curves 452 and 454 are substantially similar to curve 406 with the exception of curves 452 and 454 being 120° out of phase with curve 406.

Graph 500 also includes a second blade pitch angle pattern curve 508 and a third blade pitch angle pattern curve 510 that are substantially representative of an actual blade position feedback signal (not shown) associated with blades 442 and 444, respectively. In the exemplary embodiment, curves 508 and 510 are substantially similar to curve 506 with the exception of curves 508 and 510 being 120° out of phase in each direction with curve 506. Alternatively, each of curves 506, 508, and 510 have a unique blade pitch angle pattern for blades 440, 442, and 444, respectively, that enables blade pitch control system 200 to function as described herein.

Curves 506, 508, and 510 have similar, but not substantially similar, shapes as curves 406, 452, and 454 (all shown in FIG. 7). This technical effect is primarily due to the blade pitch angle compensation signals as represented by curves 406, 452, and 454 are combined with other blade pitch angle command signals and the smoothing effect provided by the more slowly acting electromechanical pitch drive devices, both described above.

During operation, as illustrated in FIGS. 7 and 8, for example, and not limited to, blades 444 and 442 follow similar blade pitch transients 120° and 240°, respectfully, out of phase with blade 440. For example, as blade 440 transits through approximately the 90° position along blade azimuth 302 with a blade pitch compensation value of approximately 1.3° and a measured blade pitch position of approximately 4.0°, blade 442 transits through approximately a 330° position along blade azimuth 302 with a blade pitch compensation value of approximately −0.8° and a measured blade pitch position of approximately 2.0°. Similarly, blade 444 transits through approximately a 120° position along blade azimuth 302 with a blade pitch compensation value of approximately −0.8° and a measured blade pitch position of approximately 2.2°. In summary, for at least one of blades 440, 442, and 444 having a relatively greater pitch angle to reduce noise generation, at least one of the other blades 440, 442, and 444 have a relatively smaller pitch angle to increase power generation.

Therefore, modulating the pitch values of blades 440, 442, and 444 in cooperation with each other as a function of their position about blade azimuth 302 facilitates controlling a rotational speed of rotor 108, and thereby controlling linear velocities of blade tip portions 125 to facilitate reductions of amplitudes of acoustic emissions in a range of 1 dB to 3 dB, including an average overall reduction of 2.5 dB, while reducing a potential for reductions in electric power generation, as described further below. Such reductions in acoustic emissions facilitate maintaining acoustic emissions generated by wind turbine generator 100 below local regulatory levels.

Figure 9:
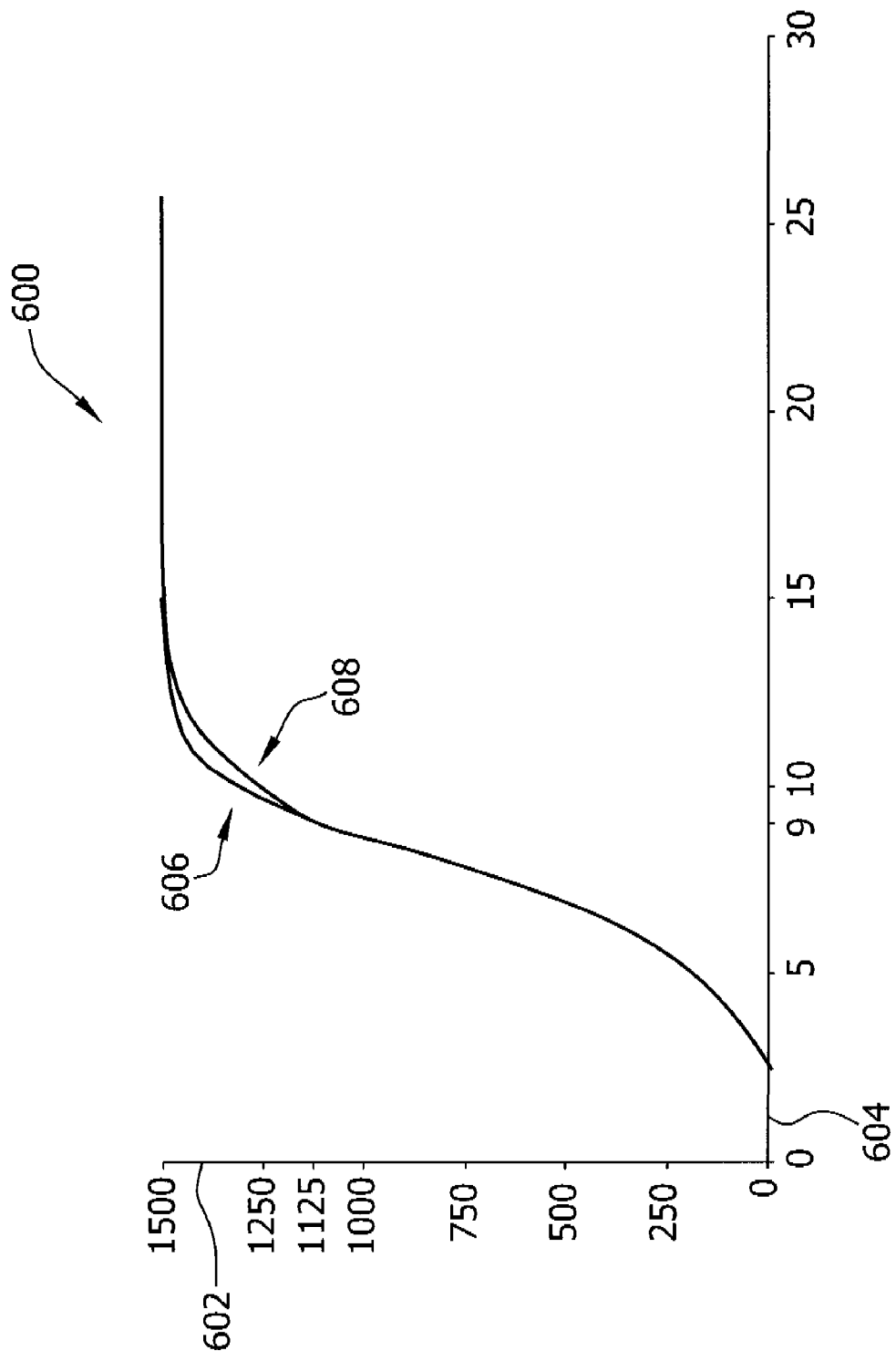
FIG. 9 is a graphical view of an exemplary electric power generation profile with and without acoustic emissions reduction that may be used with the wind turbine generator shown in FIG. 6.

FIG. 9 is a graphical view, or graph 600 of an exemplary electric power generation profile with and without acoustic emissions reduction that may be used with wind turbine generator 100 (shown in FIG. 3). Graph 900 includes an ordinate, or y-axis 602, wherein y-axis 602 is substantially representative of an actual electric power generation measurement values and is divided into units of kilowatts (kw) in 250 kw increments from 0 kw to 1500 kw. Graph 600 also includes an abscissa, or x-axis 604, wherein x-axis 604 is substantially representative of wind speed in and is divided into units of meters per second (m/s) in 5 m/s (11.2 mph) increments from 0 m/s (0 mph) to 30 m/s (67.1 mph).

Graph 600 further includes a measured electric power generation curve 606 that substantially represents electric power generation of wind turbine generator 100 (shown in FIGS. 1, 2, 3, 4 and 6) without blade pitch control system 200 (shown in FIGS. 2 and 3) in service. Graph 600 also includes a measured electric power generation curve 608 that substantially represents electric power generation of wind turbine generator 100 with blade pitch control system 200 in service. Specifically, in the exemplary embodiment, both graphs 606 and 608 illustrate ten-minute averages of measured power generation values and wind speed values.

In the exemplary embodiment, both graphs 606 and 608 illustrate no power generation below wind speeds of approximately 3 m/s (6.7 mph). Also, both graphs 606 and 608 illustrate a substantially linear increase of power generation from approximately 0 kw to approximately 1250 kw between wind speeds of approximately 3 m/s (6.7 mph) and 10 m/s (22.4 mph). Further, both graphs illustrate a decreasing rate of power generation increase as a function of increasing wind speed, that is, between wind speeds of approximately 10 m/s (22.4 mph) and 13 m/s (29.1 mph) power generation more slowly increases from approximately 1250 kw to approximately 1500 kw. For wind speeds greater than approximately 15 m/s (33.5 mph) to approximately 25 m/s (55.6 mph), power generation remains substantially constant at approximately 1500 kw. Alternatively, any wind speed-to-electric power generation relationship for any make and/or model of wind turbine generator 100 that enables operation of blade pitch control system 200 as described herein is used.

During operation, as described above and illustrated in FIGS. 7 and 8, blades 440, 442, and 444 adjust their associated blade pitch angles as a function of position about blade azimuth 302. In the exemplary embodiment, blade pitch control system 200 (shown in FIGS. 2 and 3) is automatically activated with a plurality of conditions being satisfied. A first condition, in the exemplary embodiment, is that a ten-minute running average of measured blade pitch be less than a range of approximately 5° to 6°. Alternatively, any range of measured blade pitch values for any make and/or model of wind turbine generator 100 that enables operation of blade pitch control system 200 as described herein is used.

A second condition, in the exemplary embodiment, is that the ten-minute running average of electric power generation be in a range of approximately 75% to 80% of rated power generation, that is, in a range of approximately 1125 kw to 1200 kw. A wind speed range of approximately 9.0 m/s (20.1 mph) to 9.5 m/s (21.2 mph) substantially corresponds to the power generation range of 1125 kw to 1200 kw. Alternatively, any wind speed-to-electric power generation relationship for any make and/or model of wind turbine generator 100 that enables operation of blade pitch control system 200 as described herein is used.

A first technical effect of such blade pitch and power generation parameter conditions includes automatic activation of blade pitch control system 200 when a ten-minute running average of electric power generation is equal to or greater than a range of 1125 kw and 1200 kw and a ten-minute running average of measured blade pitch is less than a range of approximately 5° to 6°. In the event that either the ten-minute running average of electric power generation decreases below the range of 1125 kw and 1200 kw or the ten-minute running average of measured blade pitch is equal to or greater than a range of approximately 5° to 6°, blade pitch control system 200 is deactivated.

A second technical effect of such blade pitch and power generation parameter conditions includes facilitating maintenance of wind turbine component loading and wear within predetermined parameters. Specifically, operational loading of gearbox 136, blades 112, tower 102, and nacelle 106 (all shown in FIG. 1) are substantially unchanged with blade pitch control system 200 in service or removed from service as described herein.

A third technical effect of such blade pitch and power generation parameter conditions includes substantially simultaneously reducing noise emissions with little to no negative impact on electric power generation. FIG. 9 illustrates curves 606 and 608 within close proximity to each other, wherein curves 606 and 608 substantially overlap each other, however a small exaggerated separation is illustrated to provide perspective.

Therefore, the technical effects of modulating the pitch values of blades 440, 442, and 444 in cooperation with each other as a function of their position about blade azimuth 302 includes facilitating control of linear velocities of blade tip portions 125 to facilitate reductions of amplitudes of acoustic emissions in a range of 1 dB to 3 dB, including an average overall reduction of 2.5 dB, while reducing a potential for reductions in electric power generation, and reducing a potential for accelerated component wear.

In the exemplary embodiment, wind turbine generator 100, including specifically blade pitch control system 200, is operated with the parameters discussed above. Alternatively, any operational parameters are used that enable system 200 and wind turbine generator 100 to function as described herein.

Also, in the exemplary embodiment, blade pitch compensation values are determined via at least one algorithm statically stored electronically within a table (not shown) that is maintained within processor 202 (shown in FIGS. 2 and 3). Alternatively, blade pitch compensation values are determined dynamically using at least one algorithm programmed within processor 202.

Further, in the exemplary embodiment, when blade pitch control system 200 is in service as described above, system 200 may be used to facilitate determining a current wind speed. Specifically, in the exemplary embodiment, there is a predetermined relationship between electric power generation and wind speed as illustrated in FIG. 9. Therefore, for a given value of power generation, there exists a corresponding wind speed. In the exemplary embodiment, such a relationship is determined between approximately 9 m/s (20.1 mph) and 12 m/s (26.8 mph). Alternatively, any range of values of wind speed may be determined when system 200 is in service. Also, specifically, in the exemplary embodiment, a similar relationship between wind speed and blade pitch angle is determined for system 200 such that for a given blade pitch angle a calculated wind speed value may be generated when system 200 is in service. Further, specifically, any combination of blade pitch angle value ranges and electric power generation value ranges is used to facilitate calculating an existing wind speed.

The above-described system and method facilitate operation of wind turbine generators by actively controlling blade pitch. Such method and system includes implementation of a blade pitch control system that modulates pitch angles of each of a plurality of wind turbine blades as a function of position of the blades along an azimuthal rotation path. Specifically, a technical effect of modulating the pitch for each blade, and thereby modulating a blade tip speed by modulating a cross-sectional area of each blade that is exposed to wind, decreases a dB level of acoustic emissions, or noise, being generated. Also, specifically, modulating the pitch of the blades within a predetermined range facilitates generating electric power within a predetermined range during blade pitch transients. Further, specifically, modulating the pitch of the blades within a predetermined range facilitates reducing a potential for accelerated component wear.

Exemplary embodiments of methods and systems for operating wind turbine generators are described above in detail. The methods and systems are not limited to the specific embodiments described herein, but rather, components of systems and/or steps of the methods may be utilized independently and separately from other components and/or steps described herein. For example, the methods may also be used in combination with other wind turbine generators, and are not limited to practice with only the wind turbine generator as described herein. Rather, the exemplary embodiment can be implemented and utilized in connection with many other wind turbine generator applications.

While the invention has been described in terms of various specific embodiments, those skilled in the art will recognize that the invention can be practiced with modification within the spirit and scope of the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a wind turbine generator having at least one wind turbine blade, said method comprising:
   increasing a pitch angle of the at least one wind turbine blade as the at least one wind turbine blade rotates through a first range of blade azimuth values, to reduce acoustic emissions generated by the wind turbine generator; and
   modulating the at least one wind turbine blade by making a predetermined series of pitch angle adjustments as the at least one wind turbine blade rotates through a second range of blade azimuth values, to facilitate electric power generation by the wind turbine generator within a predetermined range.

2. A method in accordance with claim 1 wherein increasing a pitch angle of at least one wind turbine blade and modulating the at least one wind turbine blade comprises increasing a pitch angle of a first wind turbine blade and modulating a second wind turbine blade substantially simultaneously.

3. A method in accordance with claim 1 wherein increasing a pitch angle of at least one wind turbine blade and modulating the at least one wind turbine blade comprises:
   generating an acoustic emissions' amplitude profile of at least one of the at least one wind turbine blade and the wind turbine generator; and
   controlling the pitch angle of the at least one wind turbine blade as a function of the acoustic emissions' amplitude profile.

4. A method in accordance with claim 3 wherein generating an acoustic emissions' amplitude profile comprises:
   coupling at least one sound measurement device to at least one processor;
   orienting the at least one sound measurement device to receive at least a portion of the acoustic emissions generated by the wind turbine generator; and
   recording at least a portion of the acoustic emissions generated by the wind turbine generator.

5. A method in accordance with claim 4 wherein increasing a pitch angle of at least one wind turbine blade and modulating the at least one wind turbine blade comprises associating at least a portion of the acoustic emissions' amplitude profile with at least one of the first and second ranges of blade azimuth positions.

6. A wind turbine blade pitch control system comprising:
   at least one blade pitch drive mechanism coupled to at least one wind turbine blade;
   at least one processor coupled to said at least one blade pitch drive mechanism, wherein said processor is programmed to:
      increase a pitch angle of a first wind turbine blade as a first wind turbine blade rotates through a first portion of a 360° blade rotational path, thereby facilitating a reduction of acoustic emissions generated by a wind turbine generator; and
      modulate a second wind turbine blade by making a predetermined series of pitch angle adjustments as the second wind turbine blade rotates through a second portion of the 360° blade rotational path, thereby facilitating generation of electric power by the wind turbine generator within a predetermined range.

7. A wind turbine blade pitch control system in accordance with claim 6 wherein said at least one processor is further coupled to at least one of:
   at least one blade rotational path position sensing system;
   at least one blade pitch position feedback mechanism; and
   at least one sound measurement device.

8. A wind turbine blade pitch control system in accordance with claim 7 wherein said at least one sound measurement device comprises at least one microphone oriented to receive at least a portion of the acoustic emissions generated by the wind turbine generator.

9. A wind turbine blade pitch control system in accordance with claim 8 wherein said at least one microphone cooperates with said at least one processor to generate at least one feedback signal that modifies the pitch angle of the at least one wind turbine blade.

10. A wind turbine blade pitch control system in accordance with claim 8 wherein said at least one microphone comprises a plurality of microphones oriented in a predetermined array.

11. A wind turbine blade pitch control system in accordance with claim 7 wherein said at least one blade rotational path position sensing system comprises:
    at least one transponder; and
    at least one receiver coupled with said at least one transponder.

12. A wind turbine blade pitch control system in accordance with claim 11 wherein said at least one transponder comprises at least one radio frequency identification-type (RFID-type) transponder coupled to the at least one wind turbine blade.

13. A wind turbine generator comprising:
    at least one wind turbine blade; and
    a blade pitch control system comprising:
       at least one blade pitch drive mechanism coupled to said at least one wind turbine blade;
       at least one processor coupled to said at least one blade pitch drive mechanism, wherein said processor is programmed to:
          increase a pitch angle of said at least one wind turbine blade as said at least one wind turbine blade rotates through a first range of blade azimuth values, thereby facilitating a reduction of acoustic emissions generated by said wind turbine generator; and
          modulate said at least one wind turbine blade by making a predetermined series of pitch angle adjustments as said at least one wind turbine blade rotates through a second range of blade azimuth values, thereby facilitating generation of electric power by the wind turbine generator within a predetermined range.

14. A wind turbine generator in accordance with claim 13 wherein said at least one processor is further coupled to at least one of:
   at least one blade azimuthal position sensing system;
   at least one blade pitch position feedback mechanism; and
   at least one sound measurement device.

15. A wind turbine generator in accordance with claim 14 wherein said at least one sound measurement device comprises at least one microphone oriented to receive at least a portion of the acoustic emissions generated by said wind turbine generator.

16. A wind turbine generator in accordance with claim 15 wherein said at least one microphone cooperates with said at least one processor to generate at least one feedback signal that modifies the pitch angle of said at least one wind turbine blade.

17. A wind turbine generator in accordance with claim 15 wherein said at least one microphone comprises a plurality of microphones oriented in a predetermined array.

18. A wind turbine generator in accordance with claim 14 wherein said at least one blade azimuthal position sensing system comprises:
   at least one transponder; and
   at least one receiver coupled with said at least one transponder.

19. A wind turbine generator in accordance with claim 18 wherein said at least one transponder comprises at least one radio frequency identification-type (RFID-type) transponder coupled to said at least one wind turbine blade.

* * * * *